Jan. 30, 1923.
M. HALE.
COPING SAW.
FILED JAN. 9, 1922.
1,443,710.
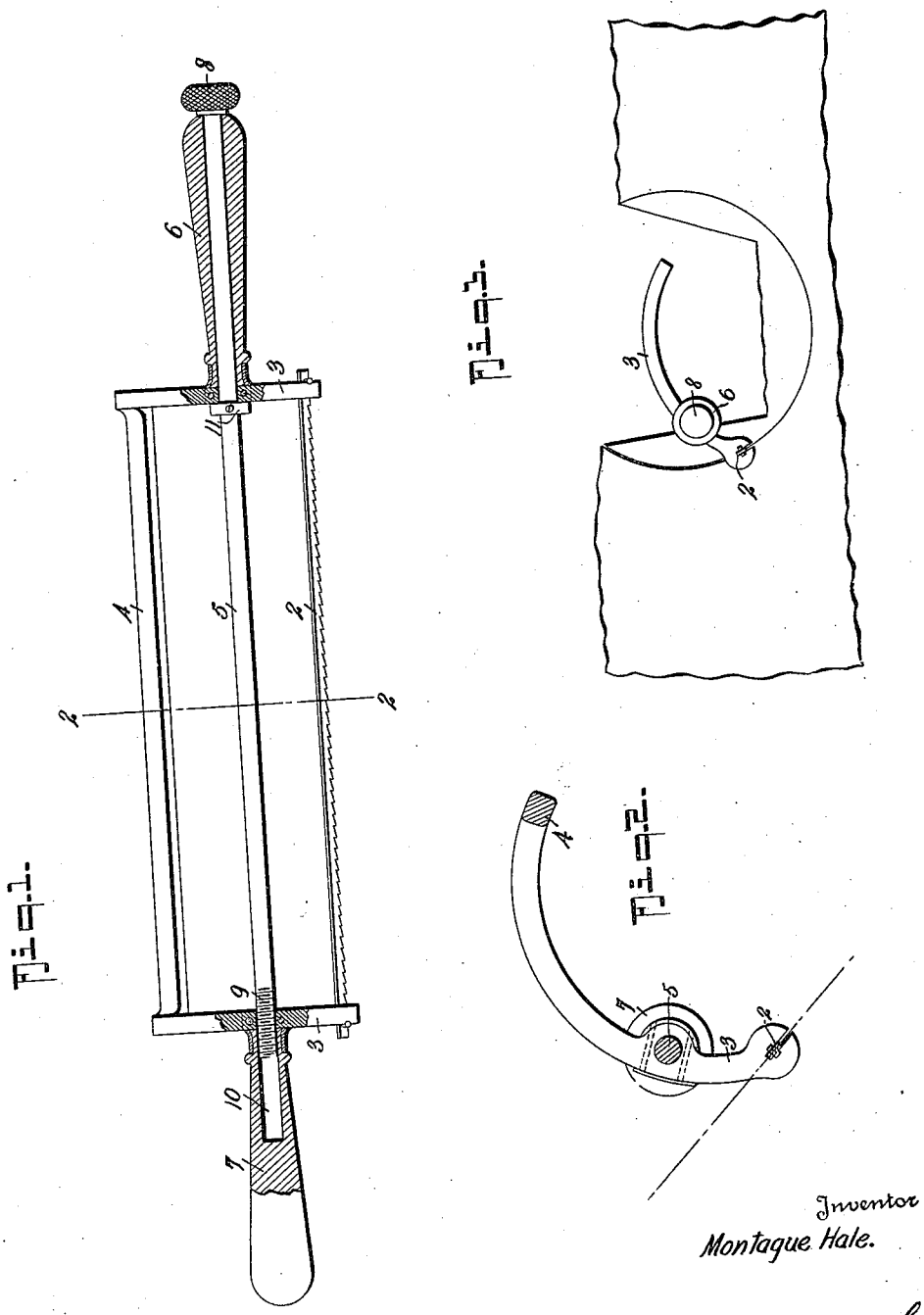
Inventor
Montague Hale.
By Fred G. Dieterich & Co.
Attorneys Patented Jan. 30, 1923.

1,443,710

UNITED STATES PATENT OFFICE.

MONTAGUE HALE, OF VANCOUVER, BRITISH COLUMBIA, CANADA.

COPING SAW.

Application filed January 9, 1922. Serial No. 527,918.

*To all whom it may concern:*

Be it known that I, MONTAGUE HALE, citizen of the Dominion of Canada, residing at Vancouver, in the Province of British Columbia, Canada, have invented certain new and useful Improvements in Coping Saws, of which the following is a specification.

This invention relates to a coping saw wherein the saw blade is adjustably supported close to the blade, whereby any tendency of the blade to whip or release during use, is avoided. The plane of the saw is also set at an angle to the plane of the frame within which it is mounted, enabling the saw to cut around a small concave curve.

A further feature of improvement lies in the rigid connection of the handles to the frame and their entire independence of the saw tightening stem, thereby preventing accidental slackening of the saw while in use.

The invention is particularly described in the following specification, reference being made to the drawings by which it is accompanied, in which:

Fig. 1 is a side elevation and part section of the saw.

Fig. 2 is a sectional end view of the same, and

Fig. 3 is a sectional end view of the same showing its application to cut a small curve.

In these drawings 3, 4 represents an open rectangular frame across between the open ends of which the saw 2 is connected, the ends of 3 being slotted to receive the ends of the blade, each of which has a pin secured in it to engage a retaining notch across the slot.

Instead of the plane of the saw blade 2 being coincident with the plane of the frame to which it is secured, as is usual, the ends 3 of this frame are curved away from the plane of the blade 2, somewhat as shown in Figs. 2 and 3.

Handles 6 and 7 are rigidly secured to the ends 3 of the frame adjacent the connection of the blade 2 to the ends 3, the axis of which handles is parallel to the blade 2.

Passing axially through the handle 6 and through the end 3 of the frame to which that handle is connected, is a tightening stem 5 having a milled head 8 secured on its outer end to bear against the outer end of the handle 6 by which the rod may be rotated, and a collar 11 against the inner side of 3 to maintain the stem 5 against endwise movement. The other end of this stem 5 is threaded as at 9 to pass through a corresponding threaded aperture in the other end 3 of the frame and into a chambering 10 of its handle 7.

Rotation of the stem 5 by means of the milled head 8 will thus extend apart the ends 3 of the frame to secure the saw to, or will move those ends together to enable the same to be released, according to the direction of rotation of the stem.

The ends 3 of the frame 4 being curved and slit to receive the saw at an angle to that curve, enables the saw to be used to cut around a much smaller curve than can be done with an ordinary saw of this class.

Further, the stem 5 being close to the saw, the tightness of the saw blade is not so dependent on the rigidity of the frame in which it is mounted, as when the saw is tightened against the rigidity of the entire frame, and further the saw blade is not subject to slackening and buckling, when in use.

The invention forms a convenient and serviceable tool, and one satisfying a felt want.

Having now particularly described my invention, I hereby declare that what I claim as new and desire to be protected in by Letters Patent, is:

1. A coping saw, comprising the combination with the saw blade, of an open frame between the ends of which the saw blade is connected, a handle secured to one end of the frame, the axis of which handle is parallel and adjacent the line of the saw, and a straining rod passing axially through the handle and one end of the frame and threaded in the other end of the frame.

2. A coping saw, comprising the combination with the saw blade, of an open frame across between the ends of which the saw blade is connected with the plane of the saw at an angle to the plane of the frame, a handle secured to one end of the frame the axis of which handle is parallel to and adjacent the line of the saw, a straining rod passing axially through the handle and one end of the frame and threaded in the other end of the frame, said rod having provision by which it may be rotated, and means preventing endwise movement of the rod in the frame.

3. A coping saw, comprising the combination with the saw blade of an open frame between the ends of which the saw blade is connected with the plane of the saw at an angle to the plane of the frame, handles secured to each end of the frame the axis of which handles is parallel to and adjacent the line of the saw, a straining rod passing axially through one handle and the end of the frame to which it is secured and threaded into the other end of the frame, said rod having provision by which it may be rotated, and means preventing endwise movement of the rod in the frame.

4. A coping saw, comprising the combination with the saw blade, of an open frame across between the ends of which the saw is connected at an angle to the ends of the frame, the ends of which frame are convexly curved away from the plane of the saw, means for tightening the saw, and a handle the axis of which is parallel and adjacent the saw.

In testimony whereof I affix my signature.

MONTAGUE HALE.